(Model.)

W. W. WHITE.
FEED RACK.

No. 285,716. Patented Sept. 25, 1883.

Witnesses.
Louis F. Gardner
J. W. Garner

Inventor.
Wm. W. White,
per
F. A. Lehmann, atty

UNITED STATES PATENT OFFICE.

WILLIAM W. WHITE, OF KIRKSVILLE, OHIO.

FEED-RACK.

SPECIFICATION forming part of Letters Patent No. 285,716, dated September 25, 1883.

Application filed March 29, 1883. (Model.)

*To all whom it may concern:*

Be it known that I, WILLIAM W. WHITE, of Kirksville, in the county of Licking and State of Ohio, have invented certain new and useful Improvements in Feed-Racks; and I do hereby declare the following to be a full, clear, and exact description of the invention, such as will enable others skilled in the art to which it pertains to make and use it, reference being had to the accompanying drawings, which form part of this specification.

My invention relates to an improvement in feed-racks; and it consists in the arrangement and combination of parts, which will be more fully described hereinafter, whereby a cheap and simple rack is produced for feeding sheep.

Figure 1:
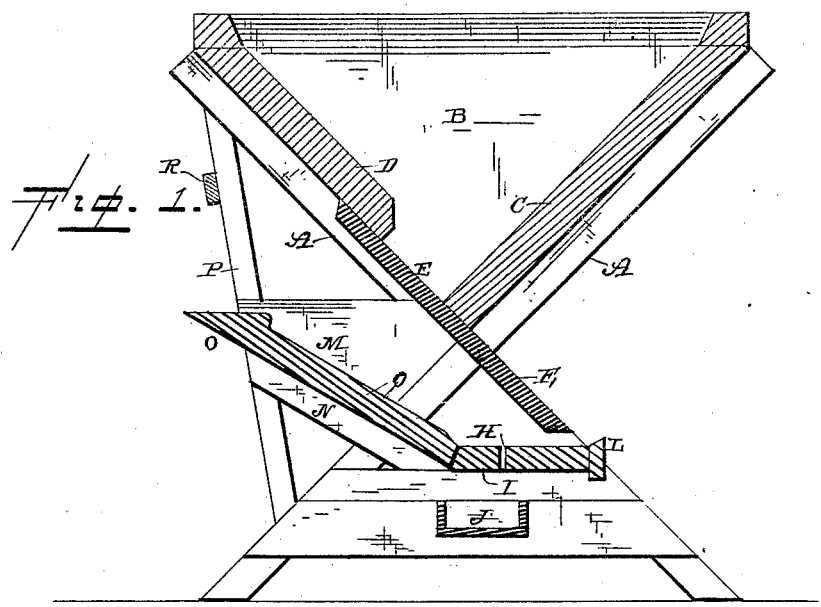
Figure 2:
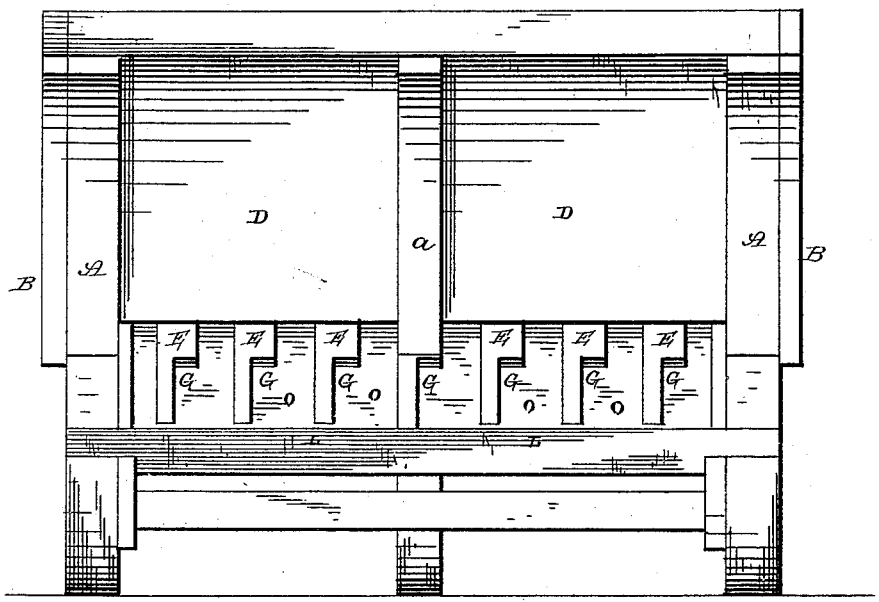

Figure 1 is a vertical cross-section of my invention. Fig. 2 is a side elevation of the same.

At each end of the rack are two cross-timbers, A, which are mortised into each other, and upon which the rack is built. Upon the outer side of these cross-timbers are secured the end pieces, B, and to their inner sides are secured the wide side piece, C, and the narrow one, D. These two side pieces are inclined toward each other at their lower edges, and form a trough in which hay is thrown, and which by its shape causes the hay and all feed that is thrown into it to settle down toward its bottom.

To the side of the short piece D, and at the lower edge of the wide piece C, are secured a number of bars, E, which extend diagonally downward, and which have one-half of their lower ends cut away at G, as shown in Fig. 2, so as to allow the sheep to get their heads readily in between them, so as to get what is called the "waste feed." The upper portions of these bars are set closely together, so as to prevent the hay from falling through, and hence it is necessary to cut away their lower ends, as shown. The central one of these bars is made heavier and stronger than the others, and the side of the wide board D is braced by the strip a, which extends along down its side, and which has its lower end extended to the ground or secured to the central bar.

Under the bottom of the rack is secured the horizontal bottom board H, which has a slot, I, made through its center for the purpose of allowing the hay-seed to drop through into the removable trough J, which is placed underneath to receive it. Upon that side of the bottom board toward which the ends of the rack-bars extend is secured a strip, L, which has its upper edge projecting above the board for the purpose of preventing the seed and hay from dropping off upon the ground. Upon the opposite side of the bottom board, placed in between the two guides M N, is the removable side board, O, which extends diagonally downward upon the same side as the rack-bars, and which allows the sheep to have free access to the hay, and serves to prevent them from dropping any of the hay upon the ground. The inner ends of these guides also form end pieces to prevent any of the hay or seed from falling off at the end of the frame. Secured to the two vertical braces P, which are secured to one side of the rack, is the horizontal strip R, which is raised just high enough above the board O to prevent the sheep from raising their heads upward at the same time that they are pulling the hay from the rack, and thus prevent them from pulling it out and dropping it upon the ground. Upon this side of the rack the sheep feed directly from the trough, and all that they drop upon the bottom board is what is called the "waste feed," and which is all that the sheep upon the other side can reach.

Over the top of this rack may be placed a roof or covering of any kind, which will serve both to cover the hay and to protect the sheep.

Having thus described my invention, I claim—

In a feed-rack, the combination of the bars A, crossed at their centers, the side pieces, C D, secured thereto, the central bar, a, the side board, O, trough J, the board H, having the slot I, and the bars E, the parts being arranged to operate substantially as shown.

In testimony whereof I affix my signature in presence of two witnesses.

WILLIAM W. WHITE.

Witnesses:
J. S. GOLD,
J. F. HOFFMAN.